United States Patent
Johnson et al.

[11] Patent Number: 5,917,568
[45] Date of Patent: Jun. 29, 1999

[54] ADAPTIVE ATTENUATING SPATIAL LIGHT MODULATOR

[75] Inventors: Kristina Mary Johnson, Longmont; Ido Bar-Tana; Douglas John McKnight, both of Boulder, all of Colo.

[73] Assignee: The Regents of the University of Colorado, Boulder, Colo.

[21] Appl. No.: 08/272,726

[22] Filed: Jul. 8, 1994

[51] Int. Cl.⁶ ............................ G02F 1/133; G02F 1/1335
[52] U.S. Cl. ................................................ 349/116; 349/96
[58] Field of Search .......................... 359/72, 85, 55, 359/56, 63; 345/48, 99, 147

[56] References Cited

U.S. PATENT DOCUMENTS

| | | | |
|---|---|---|---|
| Re. 29,684 | 6/1978 | Gordon | 359/72 |
| 3,705,310 | 12/1972 | Wild | 359/72 |
| 4,917,477 | 4/1990 | Bechtel | 359/72 |
| 4,941,735 | 7/1990 | Moddel | 359/72 |
| 4,961,615 | 10/1990 | Owechko et al. | 350/3.68 |
| 5,011,782 | 4/1991 | Lamb et al. | 437/2 |
| 5,019,898 | 5/1991 | Chao et al. | 358/81 |
| 5,096,279 | 3/1992 | Hornbeck et al. | 359/230 |
| 5,119,214 | 6/1992 | Nishii et al. | 359/7 |
| 5,151,718 | 9/1992 | Nelson | 346/160 |
| 5,168,378 | 12/1992 | Black | 359/38 |
| 5,172,256 | 12/1992 | Sethofer | 359/77 |
| 5,177,628 | 1/1993 | Moddel | 359/72 |
| 5,178,445 | 1/1993 | Moddel | 359/72 |
| 5,206,629 | 4/1993 | DeMond et al. | 340/719 |
| 5,223,857 | 6/1993 | Loce et al. | 346/108 |
| 5,231,388 | 7/1993 | Stoltz | 340/783 |
| 5,235,232 | 8/1993 | Conley et al. | 310/303 |
| 5,276,539 | 1/1994 | Humphrey | 359/40 |
| 5,343,313 | 8/1994 | Fergason | 359/83 |
| 5,448,382 | 9/1995 | Land | 359/43 |

OTHER PUBLICATIONS

Groupe Optique et Systemes De Communication Article "Anti–Blooming Component for CCD Use" by M. Guena et al, pp. 13–14.

Article Entitled "Transferred–Silicon AMLCDs" by Werner, Information Display Magazine, Oct. 1993, pp. 21–23.

Primary Examiner—William L. Sikes
Assistant Examiner—Tiep H. Nguyen
Attorney, Agent, or Firm—F. A. Sirr; E. C. Hancock; Holland & Hart llp

[57] ABSTRACT

An optically addressed, optical relaying device placed between crossed polarizers utilizes an array of pixels made up of photodetectors, circuitry, and modulating pads, and an analog liquid crystal to modulate the intensity of an optical signal on a pixel by pixel basis. The photodetector generates a current proportional to the light detected. Once the current exceeds a certain level, the circuitry stores a charge on the modulating pad proportional to the photo-induced current. This stored charge rotates the molecules of the liquid crystal thereby rotating the polarization of the light signal. The output polarizer then attenuates the light beam according to the change in polarization.

21 Claims, 5 Drawing Sheets

ADAPTIVE ATTENUATING SPATIAL LIGHT MODULATOR

BACKGROUND OF THE INVENTION

1. Field of the Invention

This invention relates to apparatus and methods for controlling the contrast of an image on a pixel by pixel basis. More specifically, this invention relates to apparatus and methods for utilizing a liquid-crystal-on-silicon optically addressed pixel array, with on-pixel circuitry to attenuate the optical output in proportion to the intensity of the input light for intensities that are above a preset threshold intensity.

2. Description of the Related Art

It is often desirable to control the contrast of specific regions of an image in a variety of applications despite extreme variations in brightness of light emanating from neighboring such regions. For example, intensified CCD cameras used for night vision suffer from blooming and halo, meaning that distant, bright sources of light look larger and closer than they are, because the excess charge on the CCD "spills over" into adjacent areas. This results in distortion and/or masking of the portion of the image originating near the bright light source. Some uses for localized contrast control might include a welding face mask which attenuates only the flare and sparks, or laser safety goggles which attenuate only the laser beam. Currently, there is no means available to control the intensity of an image, in real time, on a pixel by pixel basis.

It is known in the art to achieve desired output intensity of light by various means. U.S. Pat. No. 5,231,338 by Stalls discloses a color display system using Spatial Light Modulators (SLMs) wherein light from three primary beams is directed to a set of color regulating SLMs. Each one of these SLMs has an array of pixels which can be selectively switched on to get a desired intensity of color. U.S. Pat. No. 5,223,857 by Lace et al discloses a pulsed imaging, pulse width modulation raster output scanner which obtains three exposure levels by using pulse width modulation and spatial filtering. U.S. Pat. No. 5,206,629 by DeMond et al discloses an SLM and memory for digitized video and display with several redundant rows of cells permitting differing intensity by illuminating selected cells in each column. However, none of these patents are capable of resolving the aforementioned problem of blooming in that they do not disclose a method or apparatus for limiting output intensity by varying attenuation based on input intensity.

It is also known in the art to vary the brightness of an output image. U.S. Pat. No. 5,151,718 by Nelson discloses an SLM array which can be operated by varying the brightness of individual pixels to compensate for optical system deficiencies. The adaptation does not take place in real time. U.S. Pat. No. 4,961,615 by Owechko et al discloses an associative memory system with an SLM. The SLM is used in a liquid crystal light valve comprising a liquid crystal, a photoconductor, and a grid. The grid is in a checkerboard configuration in order to confine blooming to within each aperture. No on-pixel processing occurs.

It is known in the art to correct various imperfections introduced by the device in the optical signal produced. U.S. Pat. No. 5,119,214 by Nishii et al discloses an SLM pixel array wherein the amplitude component of each cell is corrected for phase distortion. U.S. Pat. No. 5,096,279 by Hornbeck et al discloses a method of resetting the pixels of an SLM in order to solve the problem of deformable mirrors sticking to the landing electrodes.

It is also known in the art to use the intensity of the input image to produce pseudocolor. U.S. Pat. No. 5,019,898 by Chao et al discloses a method of pseudocolor encoding an image. It alters the polarization of a beam using a spatial light polarization module in accordance with the spatial distribution of intensities in the image. No on-pixel processing is done.

A need remains in the art for apparatus and methods to adaptively attenuate an optical signal on a pixel by pixel basis.

SUMMARY OF THE INVENTION

Apparatus and processes of this invention respond to an optical beam for modulating the intensity of that beam based on its input intensity. The intensity of the beam is detected for generating a modulating signal related to the input intensity thus detected. The intensity of the beam is then changed in response to said modulating signal, whereby the attenuation of the original beam and the output is a monotonically increasing function of the intensity of the original beam.

Generally, the beam attenuation is substantially constant for all beam intensities below a predetermined threshold level. Further, the intensity changing can employ a liquid crystal (LC) device selected from the group including analog liquid crystals using nematic, DHF, or electroclinic materials; guest-host absorbers; and polymer dispersed liquid crystal light scattering materials.

An object of the present invention is to control the intensity of specific regions of an image. One way of accomplishing this object is by a very-large scale integration (VLSI) silicon chip containing a two-dimensional array of pixels with on-pixel detectors, circuitry, and liquid crystal modulating pad. Each pixel photodetector detects the incident pixel light intensity and translates the light intensity to an electrical signal. This signal is fed to the pixel circuitry, which calculates the pixel attenuation according to the detected intensity and external settings. The pixel circuitry applies an appropriate voltage to a liquid crystal modulating pad, which in turn creates an electric field across a thin layer of analog liquid crystal sandwiched between the pixel array and a cover glass. The cover glass is coated with a transparent electrode made of Indium-Tin-Oxide, for example. The electric field applied to the liquid crystal by the modulating pad rotates the optical axis of the liquid crystal, which rotates the polarization orientation of the light passing therethrough. Combined with another optical polarizer, the foregoing device functions as an in-line optical attenuator. Combined with a reflector backing the crystal and a polarizing beam splitter, the foregoing device attenuates the intensity of the reflected light. Only a small portion of the incident light on the pixel is absorbed by the photodetector. Thus, most of the incident light is either passed through a transparent modulating pad and liquid crystal, or is reflected back from a reflecting modulating pad, through the liquid crystal, and is attenuated as described.

As a feature of the present invention, the intensity of an image is controlled on a pixel by pixel basis. This is accomplished by detecting the input intensity of light, generating a modulating signal related to the light intensity, and changing the polarization of the reflected light according to its input intensity and externally adjustable settings.

As a feature of the present invention, the modulating signal remains constant for all beam intensities below a predetermined threshold level. Therefore, there is almost no pixel attenuation for incident light intensities that are below an externally adjustable threshold level. Above the threshold level, the attenuation of each pixel is generally in direct proportion to the incident intensity and to an externally adjustable sensitivity setting.

In order to control the intensity on a pixel by pixel basis, the light detection and generation of the modulation signal is done by an array of pixel units. Each pixel unit contains a photodetector and modulating circuitry responsive to the photocurrent from the photodetector. Polarization shifting of the reflected light is accomplished by a layer of liquid crystal. Its axis is rotated as a function of the modulating signal.

Thus, pixel-by-pixel polarization modulation is a feature of the present invention. Each pixel unit has a photodetector to detect the intensity of the input light signal, and to generate photocurrent proportional to that intensity. Each pixel unit also has modulation circuitry which performs a predetermined function on the photocurrent and produces a modulating signal. This modulating signal is applied to a portion of a liquid crystal. The optical axis of each portion of liquid crystal is rotated by the modulating signal from the associated pixel unit. The light incident on the pixel unit which is not absorbed by the photodetector passes through the portion of liquid crystal rotated by the signal from that same pixel unit, such that the polarization of light incident on each portion of liquid crystal is changed in fixed relation to the intensity of that light.

It is a feature of the present invention that the modulating circuit is a threshold circuit for generating a monotonic modulating voltage in response to the photocurrent which is applied across two electrodes, which are placed on either side of the liquid crystal. Thus, the signal applied to a portion of the liquid crystal stays at a constant level unless the photocurrent for the associated pixel unit is above a predetermined threshold level.

The output intensity of the optical beam is modulated according to its input intensity by polarizing the input beam, detecting its intensity, generating a modulating signal related to the intensity and to external settings, changing the polarization of the light in response to the modulating signal, and passing the light through another polarizer element, the output beam. The second polarizer attenuates the output beam based on how much the light polarization has changed. To modulate the intensity on a pixel-by-pixel basis, each pixel detects the intensity of light incident on it, and generates a modulating signal related to that intensity. The modulating signal locally rotates the optical axis of a liquid crystal so that the light incident on, and detected by, a particular pixel passes through the portion of the liquid crystal whose optical axis was rotated by that pixel modulating signal.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENTS

Figure 1:
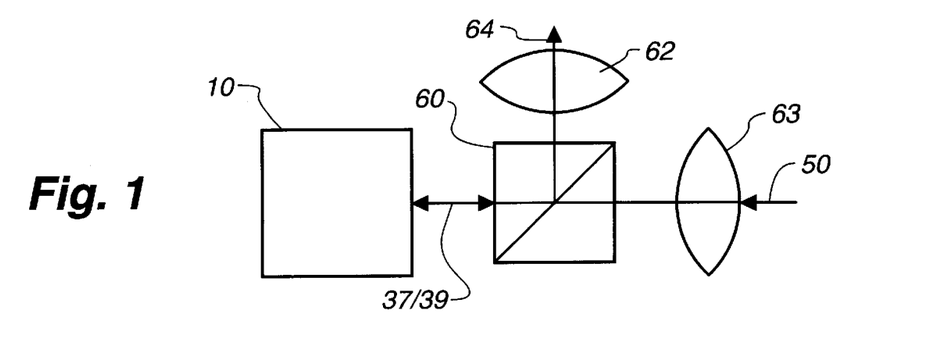
FIG. 1 is a system schematic layout, showing the invention in conjunction with input and output optics.

FIG. 1 shows how the invention, an array 10 of adaptive attenuating spatial light modulator devices, is potentially useful in a light processing system. Image light rays 50 from an object or other light source are focussed by input optics 63 through polarizing beam-splitter 60 onto the device array 10. The array 10 of optically addressed pixels is shown in plan view in FIG. 2 without the intervening optical elements.

Figure 2:
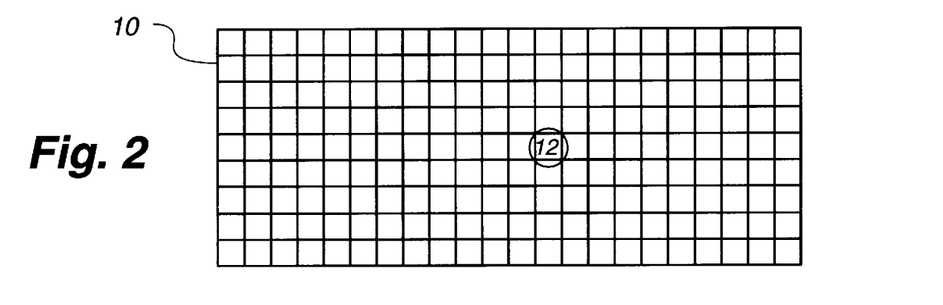
FIG. 2 is a plan view of the array of pixel elements in FIG. 1 with a blow-up showing on-pixel functions.
Figure 2A:
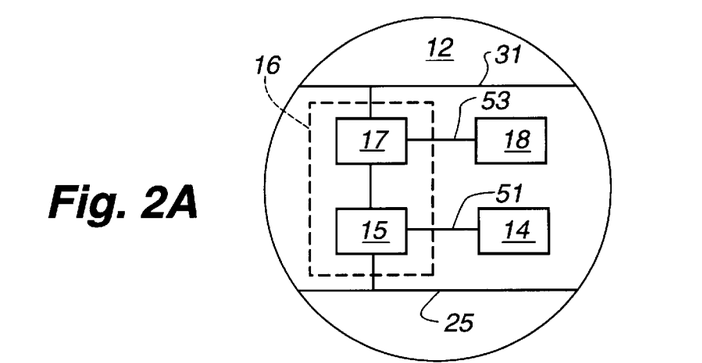

Within device array 10, the part of the incident light 37 (FIGS. 1 and 9) that hits the on-pixel photodectors is transformed to an electrical signal using on-pixel photodetector 14 (shown in FIG. 2). The photodetector generated current on conductor 51 (shown in FIGS. 2 and 3) is used by circuitry 16 to determine the degree of attenuation for application to the light reflected from the modulating pad 18 or transmitted in the case of a transmission mode device (e.g. FIG. 11).

The polarization of the reflected light 39 is modulated on a pixel by pixel basis according to its intensity. The reflected light 39 from the pixel reenters polarizing beam splitter 60. Polarizing beam splitter 60, a Wollaston prism of calcite quartz or the like and a half-slivered mirror, attenuates the light 39 according to how much the polarization has changed. Output optics 62 focuses the processed light into output image 64 for viewing or the next stage of processing.

FIG. 2 shows a schematic of the pixel array 10 and an expanded view of typical elements for performing pixel functions. The size of the array is application dependent. That is, the size, shape and number of pixel units employed ar all variable parameters and optimized for a given application. For example, if a minimum sized pixel is desired, a smaller photodetector and modulating pad can directly decrease pixel size. A smaller fabrication process, allowing finer lines and smaller transistors, would also contribute to a smaller pixel unit.

Each pixel 12 has a photodetector 14 to detect part of the incident light 37 and generate current on conductor 51 proportional to the intensity of the light 37 detected. A small portion of the incident light 37 is absorbed by photodetector 14, but most of it is reflected by modulating pad 18. Circuitry 16 receives externally adjustable clocking voltage from wire 31 and externally adjustable threshold voltage from wire 25 and performs an analog function on the photocurrent on conductor 51 such that above a preset threshold intensity, the voltage on wire 53 applied to modulating pad 18 is directly proportional to the magnitude of the photocurrent at 51 generated by photodetector 14, and is affected by external signals on 31 and 25.

Figure 3:
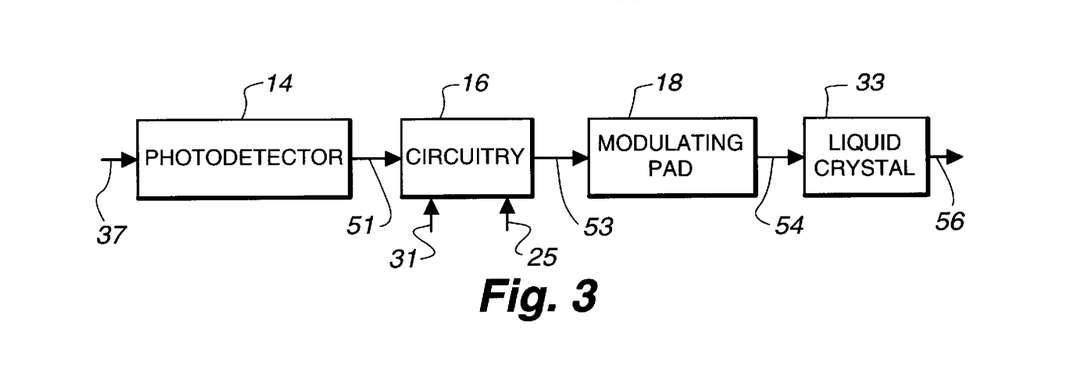
FIG. 3 shows the electrical processing sequence of a pixel in block diagram form.

FIG. 3 shows how the on-pixel functions of FIG. 2 interact with the other elements of device 10. Part of the input light intensity 37 falling on pixel 12 is absorbed by photodetector 14, generating photocurrent on conductor 51. This photocurrent is an input to circuitry 16, shown in more detail in FIGS. 6 and 10. Circuitry 16 output voltage on wire 53 is applied to modulating pad 18.

Thus the adaptive attenuating spatial light modulator is an array of smart pixels that controls the contrast of specific regions of an image on a pixel-by-pixel basis. Preferably, it is a liquid crystal on silicon, spatial light modulator: a silicon integrated circuit including an array of optically addressed pixels with on-pixel circuitry, which performs an analog function on the detected signal. The output from each pixel is also optical, under control of an electric field applied across a thin layer of liquid crystal that is sandwiched between the VLSI silicon chip 11 and cover glass 35 (see FIG. 5). The optical axis of the liquid crystal rotates in proportion to the applied voltage from the pixel circuit output. Placed between crossed or parallel polarizers, it modulates the intensity of the reflected light.

Of course those skilled in the art will recognize that the device can also utilize an amorphous semiconductor material as the photoprocessing member. Examples include amorphous silicon, CdS, CdSe, or a semiconductor such as GaAs, GaAlAs, IaP or II–VI compound structures or multiple quantum wells.

The function of the module is to reduce the light intensity reflected by each pixel in proportion to the light incident on the photodetector 14 and in response to externally adjustable parameters. The pixel attenuates the output only when the local incident illumination exceeds an externally adjustable threshold. Above threshold, control of the degree of attenuation (the slope of the graph above threshold) is also externally adjustable.

The schematic of the pixel array is shown in FIG. 2. Each pixel has a photodetector 14, a threshold circuit 15, a voltage controlled switch 17 and a liquid crystal modulating mirror or pad 18 which controls the amount of light reflected by each pixel. Incident light intensity is converted to an electrical signal by the photodetector 14. This signal is then compared by threshold circuit 15, which clips the signal if it is below a globally adjustable value. The output from the threshold subcircuit, in the form of a current, charges the metal modulating mirror, whose capacitance is approximately $1.2 \times 10^{-16}$ F/$\mu m^2$. This current charges the capacitor during the write time, which determines the degree of attenuation. The shorter the period, the lower the output voltage on the pad 18 capacitor and the less output attenuation. In addition, the difference between the incident intensity and the threshold intensity also determines the degree of attenuation: the higher the difference, the more attenuation on the output.

Figure 10:
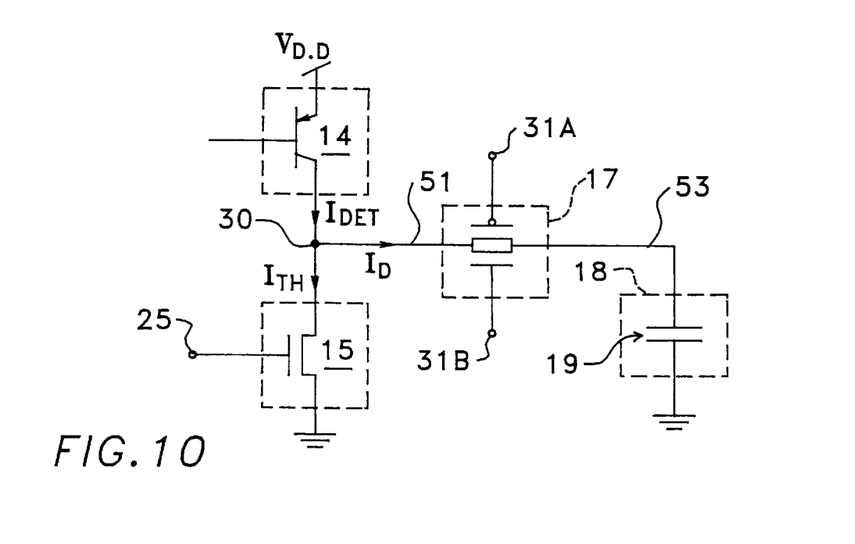
FIG. 10 is another circuit diagram of the pixel circuitry.

One arrangement of the electronic implementation of the pixel circuit is shown in FIG. 10. It is a synchronous circuit. Each pixel includes three transistors: a pass gate, and a threshold transistor. The capacitance 19 of the pixel modulating mirror acts as a storage for the pixel output during reading.

Figure 7:
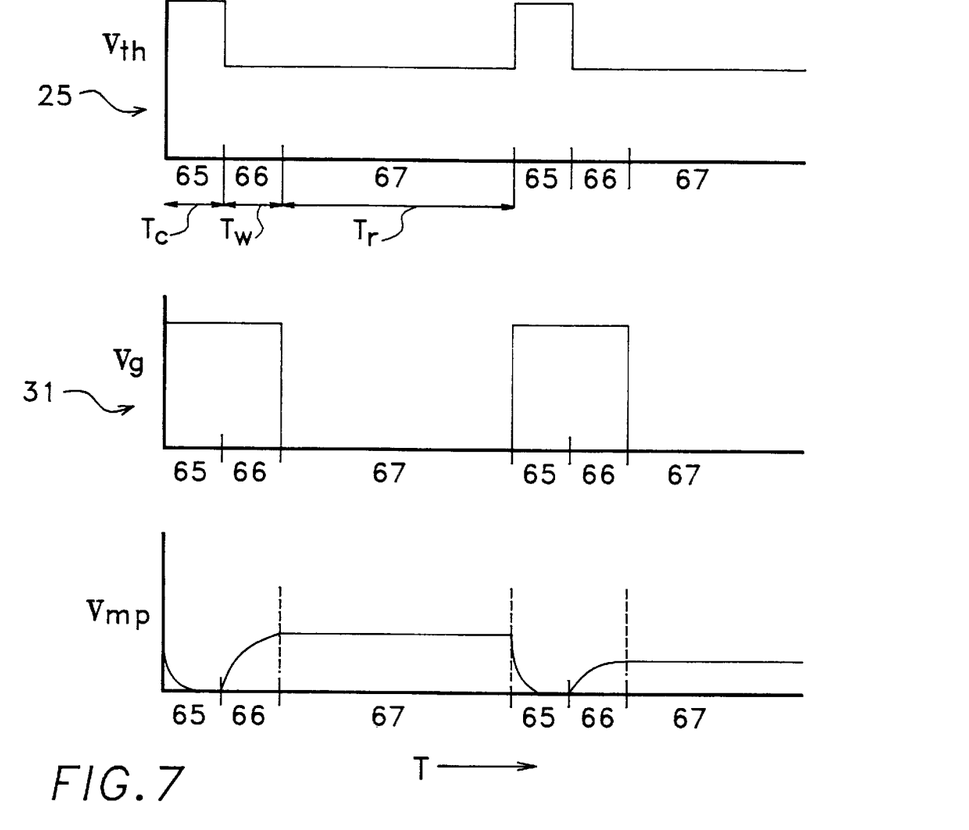
FIG. 7 is a timing diagram of the input signals to the pixels and the voltage on the modulating pad.

Typical circuit operation as illustrated in FIG. 7 is composed of three periods that make a single cycle: $T_C$, the clear time; $T_W$, the write time and $T_R$, the read time. During $T_C$, both pass transistor 17 and threshold transistor 15 are open, resulting in grounding (discharging) of the modulating mirror capacitor 19. During the write period, $T_W$, capacitor 19 is connected to the threshold node 30 by closing pass gate 17. The current out of the phototransistor 14 is linearly proportional to the light intensity incident on it. An externally adjustable threshold voltage 25 creates a threshold current $I_{th}$, which is subtracted from the detector 14 current $I_{det}$ at the threshold node 30 according to Kirchhoff's current law. The following two cases are possible:

1. If $I_{det}$ is lower than $I_{th}$, the current difference, $I_d = I_{det} - I_{th}$, flows from the capacitor 19 into the threshold node 30, and the capacitor 19 is further discharged. This corresponds to the flat section of the attenuation graph of FIG. 7.
2. If $I_{det}$ is higher than $I_{th}$, than $I_d$ will flow into the capacitor, charging it. The final capacitor voltage will depend on the length of the write time, $T_W$, and the magnitude of $I_d$. For fixed $T_W$, higher $I_d$ (corresponding to higher illumination) will result in higher capacitor 19 voltage, corresponding to higher attenuation. Note that the above currents are transient currents only.

When the write time ends, the capacitor 19 is isolated from the threshold node and its voltage is valid for reading during the read time, $T_R$. The capacitor 19 voltage creates an electric field across a liquid crystal (such as chirol smectic liquid crystals, including distorted helix ferroelectric, electroclinic materials and ferroelectric, as well as anti-ferroelectric liquid crystals, and other liquid crystals such as nematic, polymer dispersed liquid crystals, and guest-host crystals for example) that rotates its optical axis in proportion to the applied voltage. A polarizer is used to translate the orientation of the optical axis of the liquid crystal to pixel attenuation.

Control of the circuit is adjustable throughout a range between no light attenuation to total light blockage beyond a particular intensity. This control is achieved through two externally adjustable parameters:

1. The magnitude of the external threshold voltage-controls the threshold illumination, shifting the location of the knee in FIG. 8.
2. The duty cycle of $T_W$-controls the sensitivity of the device for above-threshold illumination, changing the slope of the graph in FIG. 8.

Figure 8:
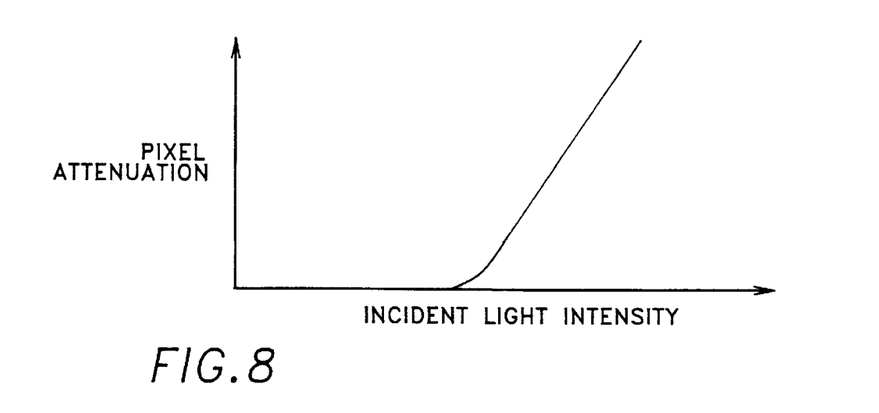
FIG. 8 is a graph showing the function implemented by each pixel in combination with the liquid crystal and crossed polarizers.

The voltage applied to the modulating mirror decreases as the photogenerated current is increased, and the threshold voltage determines the knee-point at which attenuation begins.

Figure 9:
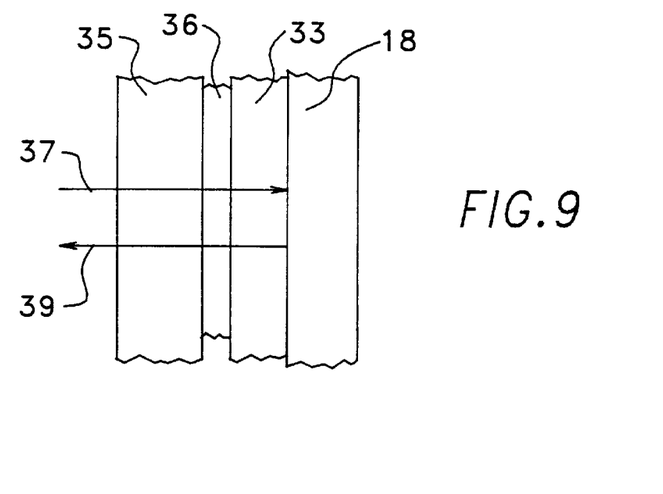
FIG. 9 shows the path the light takes within the device of FIGS. 4 and 5.

As seen in FIG. 9, liquid crystal 33 is positioned between pad 18 and electrode 36. For example, materials available for crystal 33 include distorted helix ferroelectric liquid crystals, smectic-A and analog smectic-C materials. In addition, an Indium Tin Oxide (ITO) layer could provide coating 36 on a glass plate 35 in FIG. 9 to act as the other electrode across liquid crystal 33 with ITO coating 36 maintained at a constant voltage. In the preferred embodiment, the voltage on ITO layer 36 is held halfway between the maximum and minimum voltages available to the metal modulating mirror. Most CMOS signals vary between zero and five volts. Thus, holding the ITO potential at 2.5 volts allows for symmetry with respect to the ITO voltage level. ITO layer 36 acts as the other electrode.

Voltage on 53 applied to modulating pad 18 creates an electrical field at interface 54 across liquid crystal 33 (see FIG. 3). The molecules of liquid crystal 33 between modulating pad 18 and ITO layer 36 rotate according to the electric field 54 which exists between modulating pad 18 and ITO coating 36, rotating the polarization of the light passing through that portion of liquid crystal 33.

FIG. 9 shows the path of light within a module of device array 10. The structure of device array 10 is shown in more detail in FIG. 5. Chip 11 has a layer of liquid crystal 33 on top of it, covered with an ITO coated plate of glass 35. Input light 37 passes through the glass plate 35 and liquid crystal 33. The light 39 is reflected from modulating pad 18 re-enters liquid crystal 33 and glass plate 35. In reflection mode, the light passes through liquid crystal 33 twice. Thus, ideally, the liquid crystal acts as a quarter wave plate, such that the two passes through it make it a virtual half wave plate. The optical axis of the polarized light from polarizing beam splitter 60 translates the change in polarization orientation to a change in intensity (see FIG. 1). The timing associated with the electrical and optical processing just described is shown in FIG. 7.

Figure 4:
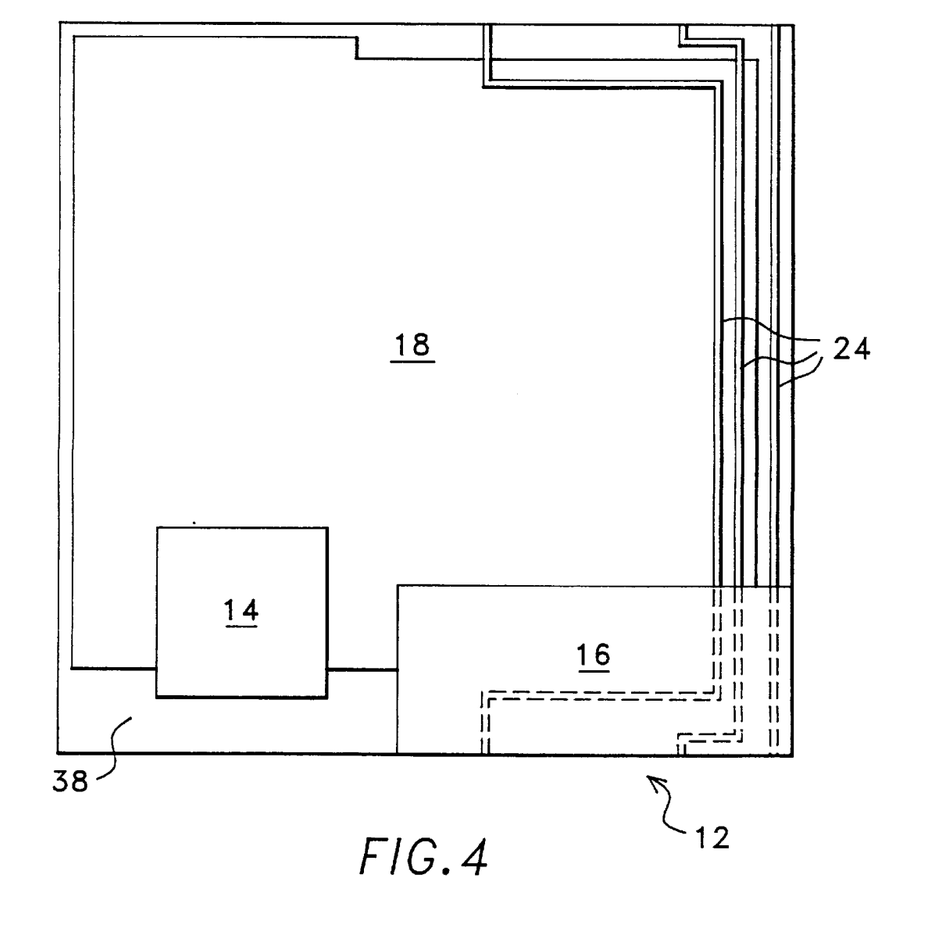
FIG. 4 is a diagram showing an example of a possible VLSI layout of a pixel.

FIG. 4 shows a possible floorplan of a physical layout of one pixel 12. Each pixel 12 has a photodetector 14, circuitry 16, and a modulating pad 18. In addition, various wires 24 carry signals to the pixel 12. These signals include the clocking voltage and the threshold voltage (note wires 31 and 25, respectively, in FIG. 2). The proportions shown in FIG. 4 are approximately accurate for a pixel 12 that is 100 microns on a side. The modulating pad 18 takes up around three quarters of the area of the pixel 12. It is desirable to maximize the ratio between the area of the modulating pad and the area of the pixel, in order to have as little "dead space" in the processed image 64 as possible. This can be accomplished by careful VLSI design and/or planorizing the chip.

In general, a chip 11 is custom designed and fabricated using common Very-Large-Scale-Integration (VLSI) techniques. The design of VLSI circuitry and photodetectors using a silicon substrate 38 is well known to those skilled in the art. In the preferred embodiment, a 2 micron n-well CMOS process is used. The glass cover which normally covers a CMOS chip is cut away from modulating pad 18 to allow the modulating pad 18 to directly contact liquid crystal 33. The photodetector 14 is a phototransistor consisting of a 25 micron n-well with a 15 micron p-diffusion. The modulating pad 18 is the metal 1 layer of the VLSI process. The liquid crystal 33 is a conventional, commercially-available analog liquid crystal. Glass plate 35 is made from commercially available, 1.2 millimeter ITO coated glass. Those skilled in the art will appreciate that many variations to the preferred embodiment are possible. For example, 1.2 micron p-well or n-well processes and variable thickness of ITO glass could be used.

Figure 5:
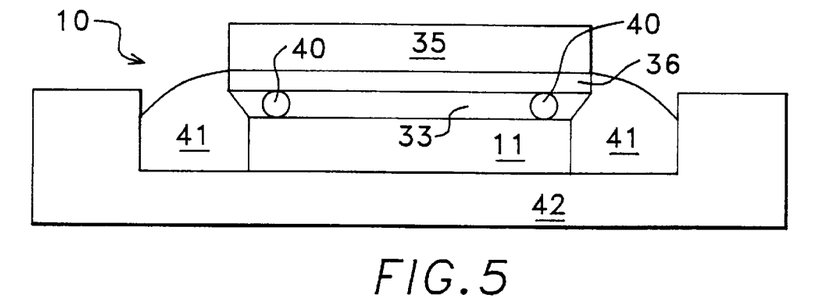
FIG. 5 is a diagram showing a cross-section of the mounting of pixel array chip of FIG. 4 including a cover glass.

FIG. 5 shows a cross section of device array 10. A glass plate 35 coated with a thin layer of ITO 36 serves as the top electrode relative to the liquid crystal cell 33, created in a gap formed between chip 11 and glass 35 by spacers 40. This gap is typically one micron thick with ferroelectric liquid crystal formed by heating a bead of that material along the edge and allowing it to flow into the gap by capillary action. Glue 41 affixes glass plate 35 to chip carrier 42.

Figure 6:
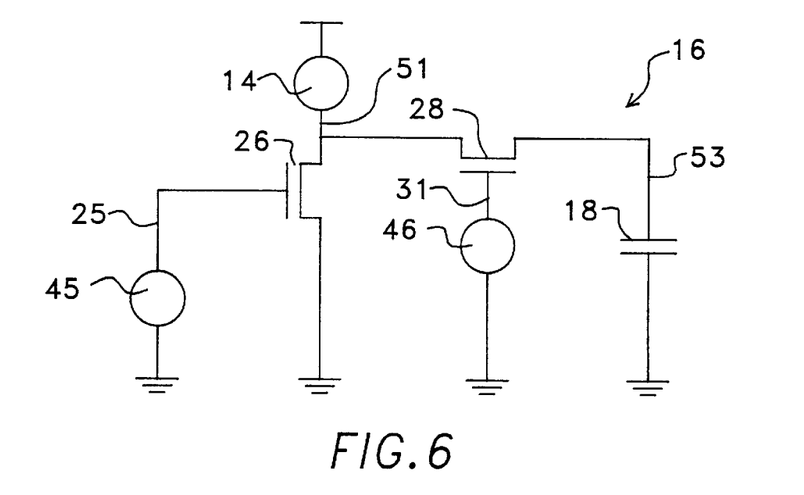
FIG. 6 is a circuit diagram of the on-pixel circuitry.

FIG. 6 is a circuit diagram of circuitry 16. Threshold voltages from source 45 at input 25 and clock signals from source 46 are externally activated and are brought to the pixel via wires 24 in FIG. 4. Threshold voltage source 45 controls threshold transistor 26. Transistor 26 acts as a voltage controlled current source. When the voltage from source 45 is high, current can pass from phototransistor 14, through threshold transistor 26 to ground. If the voltage is zero, almost no current can pass. If the voltage is at a level in between, a fixed amount of threshold current is passed through threshold transistor 26. This voltage at 25 is externally variable, but normally does not vary dynamically during operation. Those skilled in the art will appreciate that variations to the preferred embodiment are possible. For example, a pass gate made of two transistors 31A and 31B as shown in FIG. 10 may be utilized in place of single pass transistor 28 in FIG. 6.

The circuit operation, as illustrated in the time based diagrams of FIG. 7, is composed of three periods that make up a single cycle: Clear time 65 ($T_C$), write time 66 ($T_W$), and read time 67 ($T_R$). During clear time 65, both the pass transistor 28 and the threshold transistor 26 are on. They act as short circuits, resulting in grounding of modulating pad 18, thereby discharging any charge stored on modulating pad 18. During write period, 66, the voltage on threshold transistor 26 goes to an intermediate level. Thus the amount of current passing through threshold transistor 26 is fixed. If the current from the phototransistor 14 is greater than the threshold transistor current, the rest of the current begins charging modulating pad 18.

When the write time 66 ends, the clock voltage at 31 applied to the pass transistor 28 goes low. Pass transistor 28 acts like an open circuit, isolating modulating pad 18 from the rest of the circuit. The constant voltage between modulating pad 18 and the ITO layer 36 creates a constant electric field 54 across liquid crystal 33. During the entire read period 67, the light passing through the liquid crystal 33 has its polarization modulated by a nearly constant amount.

FIG. 7 shows the timing of input voltages at 25 and 31, and one example of how the voltage Vmp between modulating pad 18 and ITO layer 36 might vary. During clear time 65, any charge on modulating pad 18 is quickly drained. During write time 66, a voltage 53 builds up on modulating pad 18 which is in proportion to the intensity of light 37 sensed by phototransistor 14. No charge would accumulate on modulating pad 18 if the photocurrent at 51 was smaller than the current flowing through threshold transistor 26. During read time 67, the charge on modulating pad 18 remains constant. This results in a constant electrical field 54 across the liquid crystal 33. Thus, during read time 67, the amount of attenuation to each pixel 12 remains constant. The attenuation is not stable during clear time 65 and write time 66, but these periods are very short compared to read time 67, so that the resulting image will appear continuous.

FIG. 8 shows the pixel attenuation as a function of the incident light intensity 37. No attenuation occurs if the photocurrent at 51 resulting from the detected light intensity is below a predetermined, externally adjustable threshold current. In this case, all of the photocurrent is drained by the threshold transistor 26. However, if the detected light intensity is above the threshold level, pixel 12 begins attenuating the output light intensity. The voltage at 53 on modulating pad 18 causes the molecules in the analog liquid crystal to rotate, changing the polarization of the output optical beam.

As the intensity increases further, the voltage 53 on modulating pad 18 increases, further rotating the optical axis of the liquid crystal, which in turn further rotates the polarization orientation of the reflected light. Since the input beam was polarized, and the output beam goes through a crossed polarizer, this increasing rotation results in increasing attenuation. In the preferred embodiment described herein, the attenuation increases linearly with increasing light intensity above the threshold level. Those skilled in the art will appreciate that other functions could easily be implemented. In FIG. 8, the threshold point is determined by the voltage from threshold source 45 at input 25. An increase in the threshold voltage moves the knee to the right. The slope of the graph may be increased by making the write time Tw longer, as shown in FIG. 7.

Figure 11:
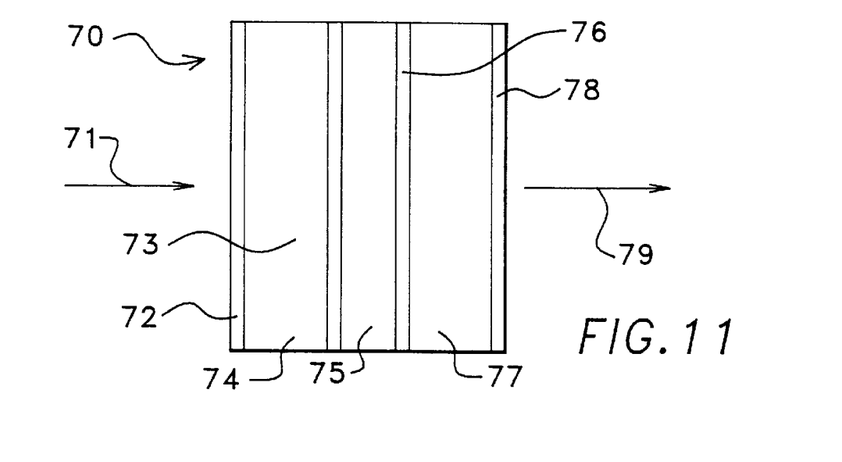
FIG. 11 is another embodiment of the present invention wherein light is potentially attenuated as it passes through the device.

The system of FIG. 1 is shown and described herein as a reflection mode spatial light modulator. It is likewise possible to implement the present invention as a transmission mode system with FIG. 11 illustrating one embodiment of this invention for that purpose. That is, FIG. 11 is a side view of one pixel element designed to function in the transmission mode. It is possible to fabricate a pixel array using contemporary lift-off technology such is described in the article entitled "Transferred Silicon AMLCDs" by K. Werner in the October 1993 issue of *Information Display* on pages 21–23.

In the FIG. 11 embodiment, input light 71 passes through an initial polarizer layer 72 and through glass substrate 73. The light is detected and processed by circuitry contained within layer 74 on the other side of glass substrate 73 in a manner substantially as described with respect to the circuitry for the FIG. 1 embodiment. The circuitry is fabricated on glass substrate 73 by the aforementioned lift-off technology.

The circuitry in layer 74 modulates liquid crystal layer 75. A cover glass 77 with an Indium Tin Oxide layer 76 serves as the other electrode for the liquid crystal cell 75. A second polarizer layer 78 completes the system for controlled attenuation of the intensity of the light passing through this particular pixel element.

Figure 12:
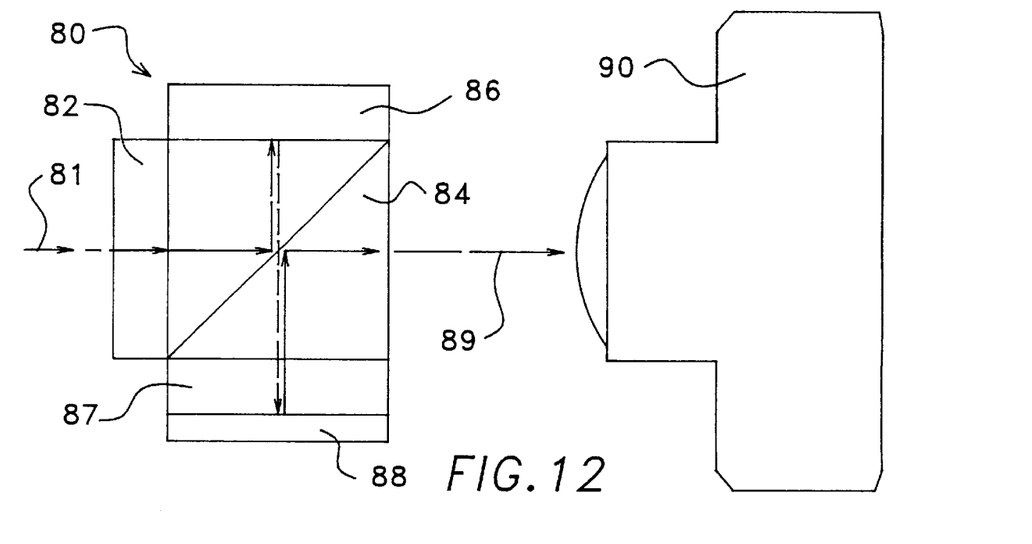
FIG. 12 is an embodiment employing a reflective attenuation mode of operation with a folded optic path.

The in-line light attenuator structure of FIG. 11 is well suite for many applications. For example, it could form an input light controlling module for cameras. However it is also possible to adapt the reflective spatial light modulator in accordance with this invention as an attachment assembly 80 for a conventional camera 90 is illustrated in FIG. 12.

More particularly, input light 81 passes through polarizer layer 82 and is reflected by beam spitter 84 into an adaptive attenuating spatial light modulator 86. In module 86, the incident light is processed as a function of the input intensity just as it was described for the FIG. 1 embodiment. This reflected light passes through beam splitter 84 and a quarter wave plate 87 into mirror 88. It is thus directed into appropriately attenuated output beam 89 as the light allowed to enter camera 90. Similarly, the input lens for camera 90 could replace plate 87 and mirror 88 so as to receive the light beam from modulator 86.

The circuits shown and described above for FIGS. 6 and 10 are particularly useful for linear attenuation of the output light intensity. However, other non-linear responses are possible within the spirit of this invention. For instance, in FIG. 10, adding a diode connected MOSFET in series with phototransistor 14 can produce a logarithmic response.

There are various materials suitable for use in the present invention for attenuating the intensity of incident light, in addition to the polarization shifting desired above. For example, polymer-dispersed liquid crystals (PDLCs) produce the attenuation result by light scattering via a relatively low voltage-controlled input. A guest-host liquid crystal can similarly function by light absorption, also via a control voltage.

With regard to polarization shifting, these can include: (a) ferroelectric liquid crystals, (b) distorted helix ferroelectrics (DHF), (c) nematic (twisted or supertwisted), (d) electroclinic, (e) PDLC's, and (f) guest-host liquid crystals. Note that items (a), (b), and (d) are part of a broader class called Chirol Smectic liquid crystals (CSLCs).

Unpolarized light can be modulated by means of PDLCs. These materials exhibit an analog response and modulate the light through the electrically controlled orientation of the molecules in small liquid crystal droplets, which are encapsulated within a polymer matrix. By aligning the liquid crystal molecules, the apparent refractive index change seen at the polymer/liquid crystal interface is reduced, so reducing the scattering form the droplets, and the attenuation of an incident beam.

The guest-host LC configuration can be arranged to modulate both polarized and unpolarized light. In the configuration which is used to modulate on polarization of light, a dichroic dye (the guest) is added to a nematic liquid crystal (the host). When an electric field is applied to the LC cell, the host material reorients which, in turn, reorients the dichroic dye, so changing the absorption of one polarization of the incident light. In a typical configuration, an increasing voltage leads to a reduction in attenuation. This can be accounted for by choosing the polarity of the circuit design.

Guest-host materials can be arranged to modulate unpolarized light by choosing a chirol nematic liquid crystal with a fairly short pitch as the host material. The surfaces of the cells are treated to cause the liquid crystal to align in many domains of differing orientations. Application of an electric field can orient all the molecules parallel to the field in a nematic phase. This nematic phase aligned parallel to the applied field absorbs less light than the multi-domained chirol nematic phase.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. Apparatus responsive to a variable intensity input optical beam for modulating the intensity of that beam in a variable manner, based on the magnitude of its input intensity, comprising:

means detecting the intensity of the input beam for generating a variable magnitude modulating signal that is related to the input intensity detected, liquid crystal means for changing polarization of the input beam in response to the magnitude of said modulating signal, and polarization sensitive attenuating means responsive to said changed polarization of the input beam, said attenuating means generating an output beam whose intensity varies as a function of the magnitude of said modulating signal, whereby attenuation of the input beam is a monotonically increasing function of the intensity of the intensity of the input beam.

2. Apparatus in accordance with claim 1 wherein said attenuation is substantially constant for all input beam intensities that are below a predetermined threshold intensity level, and wherein said attenuation is a direct function of input beam intensity above the predetermined threshold intensity level.

3. Apparatus in accordance with claim 1 wherein said liquid crystal means includes a liquid crystal device selected from the group including analog liquid crystals using nematic and chiral smectic liquid crystals, including electroclinic materials and DHF, ferroelectric and anti-ferroelectric liquid crystals, guest-host liquid crystals, and polymer dispersed liquid crystal light scattering materials.

4. Apparatus for relaying polarized light from a source with a variable and controlled intensity, comprising;

photodetector means responsive to light received from the source for producing an electrical output signal having a magnitude that is directly indicative of the intensity of the light thus received, a liquid crystal for passing light received from the source, and responsive to said magnitude of said photodetector output signal for shifting the polarization of light passing therethrough in direct relation to said magnitude of said photodetector output signals, and polarization sensitive light filtering means for receiving light which has passed through said liquid crystal, and for passing it to an output light path with an intensity that is proportioned to the amount of polarization shifting effected by said liquid crystal.

5. Apparatus in accordance with claim 4 wherein said liquid crystal further includes first and second electrical conductors positioned relative to said liquid crystal for coupling said photodetector output signal thereto.

6. Apparatus in accordance with claim 5 wherein said conductors are positioned on opposite sides of said liquid crystal.

7. Apparatus in accordance with claim 6 wherein said conductors are positioned transverse to the path of light passing through said liquid crystal, and at least one of said conductors is constructed of transparent material.

8. Apparatus in accordance with claim 7 wherein said first conductor is of transparent material and is positioned between the source of light and said liquid crystal, and said second conductor is located on the side of said liquid crystal opposite said first conductor and is constructed so as to include light reflective material.

9. Apparatus in accordance with claim 7 wherein said conductors are both of transparent material, and said light filtering means is positioned on the side of said liquid crystal opposite from the side on which light from the source enters said liquid crystal.

10. Apparatus in accordance with claim 4 including means establishing a threshold level relative to said photodetector means' output signal for causing said liquid crystal to pass light without polarization shift in response to a said photodetector means' output signal that is below said threshold level, and for causing said liquid crystal to shift light polarization in response to a said photodetector means' output signal that is above said threshold level, said polarization shift being in proportion to an amount of the output signal that exceeds said threshold level.

11. The method of relaying light from a variable intensity source to an output light path with a controlled intensity that is a variable function of the variable intensity of the source, comprising the steps of;

receiving light from said source, determining the variable intensity of said received light, shifting polarization of said received light by a variable amount that is representative of the determined variable intensity of said received light, providing polarization responsive light attenuating means, and delivering said polarization shifted light to said attenuating means and then to the output light path with an intensity proportioned to the variable amount of polarization shifting introduced by said shifting step.

12. The method in accordance with claim 11 which includes the step of preventing the operation of said shifting step until the intensity of said received light exceeds a predetermined threshold level.

13. Apparatus for relaying light representing a variable intensity image emanating from a source with an intensity that varies as a function of the variable intensity of the images, comprising;

a plurality of modules each positioned for receiving a variable intensity polarized respective segment of the light from the image from the source, wherein each of said modules operates to effect an additional variable polarization shift of the received polarized segment, the variable polarization shift being a function of the variable intensity of the received polarized segment, and means for producing output light with a variable intensity magnitude that is proportional to the variable polarization shift of light introduced thereto, each said module including, photodetector means responsive to the light segment received from the source for producing an electrical output signal having a variable magnitude correlated to the variable intensity of the light thus received, a ferroelectric liquid crystal for shifting polarization of light passing therethrough in proportion to a variable biasing voltage applied thereto, modulator means responsive to said photodetector means output signal for applying the variable biasing voltage to said liquid crystal in proportion to said variable magnitude photodetector output signal, and means coupling light passing through said liquid crystal to an input of said output light producing means.

14. Apparatus for relaying polarized light from a source with controlled intensity, comprising;

photodetector means responsive to light received from the source for producing an electrical output signal having a magnitude indicative of the intensity of the light thus received, means responsive to said photodetector output signal for producing light at an output light path with an intensity that is reduced for light from the source which has an intensity greater than a preselected threshold, a liquid crystal responsive to said photodetector output signal for shifting the polarization of light passing therethrough in proportion to the magnitude of said photodetector output signal, light filtering means for receiving light which has passed through said liquid crystal and for passing it to said output light path with an intensity proportioned to the amount of polarization shifting present on the light introduced thereto, first and second electrical conductors positioned relative to said liquid crystal for coupling said photodetector output signal thereto, said conductors being positioned on opposite sides of said liquid crystal transverse to the path of light through said liquid crystal, at least one of said conductors being constructed of transparent material, and means cyclically coupling said conductors to said photodetector means output signal during a first time period, electrically isolating said conductors for a second time period, and electrically discharging said conductors for a third time period.

15. Apparatus in accordance with claim 14 which includes means controlling said preselected threshold for adjusting said preselected threshold.

16. The method of relaying light from a source with controlled intensity, comprising the steps of;

receiving light from said source, determining the intensity of said received light, shifting the polarity of said received light by an amount representative of the intensity of said received light by applying a voltage to a modulating pad for a liquid crystal during a first predetermined time period, and retaining said modulating pad applied voltage for a second predetermined time period, delivering said polarity shifted light to an output light path with an intensity proportioned to the amount of polarity shifting introduced by said shifting step, preventing the operation of said shifting step until the intensity of said received light exceeds a predetermined threshold level, and discharging said modulating pad during a third predetermined time period.

17. Apparatus for relaying light representing an image emanating from a source with controlled intensity, comprising;

a plurality of modules each positioned for receiving a polarized respective segment of the light from the image from the source, means for producing output light with a magnitude proportioned to a polarity phase shift of light introduced thereto, each said module including photodetector means responsive to a light segment received from the source for producing an electrical output signal having a magnitude correlated to the intensity of the light segment thus received, a ferroelectric liquid crystal for shifting the polarity of light passing therethrough in proportion to a biasing voltage applied thereto, modulator means responsive to said photodetector means output signal for applying said biasing voltage to said liquid crystal in proportion thereto, means coupling light passing through said liquid crystal to the input of said output light producing means, means for producing a threshold signal, and each said module further including means responsive to said threshold signal for shifting the polarity of light received by that said module after said photodetector output signal exceeds said threshold signal.

18. Apparatus in accordance with claim 17 which further includes means generating a duty cycle controlling signal for determining a slope of the polarity shift magnitude as a function of the incident light intensity, each said module further including means responsive to said duty cycle controlling signal for correlating the amount of polarity shifting introduced by said liquid crystal in accordance therewith.

19. Apparatus in accordance with claim 18 wherein said modulator means of each said module includes a light reflecting and electrically conductive substrate on a side of said liquid crystal opposite a side receiving light from the source, a transparent electrically conductive layer on the side of said liquid crystal, and means applying said photodetector output signal across said substrate and said conductive layer.

20. Apparatus in accordance with claim 18 wherein said modulator means of each said module includes transparent electrically conductive layers on opposite sides of said liquid crystal, and said output light producing means including a polarized light filter for receiving light from said crystal and for reducing the intensity of said received light as a function of the polarity phase shift applied to said light by said liquid crystal.

21. Apparatus in accordance with claim 17 which includes control means coupled to each said module for sequentially discharging said modulating means during a first time period, charging said modulating means to said photodetector output signal during a second time period, and retaining the charge on said modulating means from said second time period throughout a third time period.

* * * * *